US011151024B2

(12) United States Patent
Hwang et al.

(10) Patent No.: US 11,151,024 B2
(45) Date of Patent: Oct. 19, 2021

(54) DYNAMIC AUTOMATION OF DEVOPS PIPELINE VULNERABILITY DETECTING AND TESTING

(71) Applicant: International Business Machines Corporation, Armonk, NY (US)

(72) Inventors: Jinho Hwang, Ossining, NY (US); Shripad Nadgowda, Elmsford, NY (US); Hai Huang, Scarsdale, NY (US); Orna Raz, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/536,465

(22) Filed: Aug. 9, 2019

(65) Prior Publication Data

US 2021/0042217 A1    Feb. 11, 2021

(51) Int. Cl.
*G06F 11/36* (2006.01)
*G06F 11/30* (2006.01)
(Continued)

(52) U.S. Cl.
CPC ...... *G06F 11/3688* (2013.01); *G06F 11/3024* (2013.01); *G06F 11/3495* (2013.01);
(Continued)

(58) Field of Classification Search
CPC ............. G06F 11/3688; G06F 11/3024; G06F 11/3495; G06F 11/3676; G06F 11/3684; G06N 5/043

See application file for complete search history.

(56) References Cited

U.S. PATENT DOCUMENTS 6,978,401 B2 * 12/2005 Avvari ................ G06F 11/3676
714/38.13
7,506,312 B1 * 3/2009 Girolami-Rose ......... G06F 8/71
717/101
(Continued)

FOREIGN PATENT DOCUMENTS

WO    200148601    7/2001

OTHER PUBLICATIONS

Rothermel, G., et al. "Selecting tests and identifying test coverage requirements for modified software," Proceedings of the 1994 ACM SIGSOFT international symposium on Software testing and analysis (ISSTA '94), Thomas Ostrand (Ed.). ACM, New York, NY, USA, 169-184.

(Continued)

*Primary Examiner* — Douglas M Slachta
(74) *Attorney, Agent, or Firm* — Lieberman & Brandsdorfer, LLC

(57) ABSTRACT

An artificial intelligence (AI) platform to support a continuous integration and deployment pipeline for software development and operations (DevOps). One or more running processes are subject to monitoring to identify presence of vulnerabilities. An automated rebuild of the monitored processes is initiated, which includes constructing a map representing a relationship of test code elements corresponding to different portions of source code. The identified vulnerable source code reflected in a new container image is subject to an automatic verification to ascertain if the source code is covered by at least one of the represented test code elements. A risk assessment is employed as part of the verification. A new container image is selectively deployed responsive to the risk assessment.

18 Claims, 8 Drawing Sheets

(51) Int. Cl.
*G06F 11/34* (2006.01)
*G06N 5/04* (2006.01)

(52) U.S. Cl.
CPC ...... *G06F 11/3676* (2013.01); *G06F 11/3684* (2013.01); *G06N 5/043* (2013.01)

(56) References Cited

U.S. PATENT DOCUMENTS

| | | | | |
|---|---|---|---|---|
| 7,747,987 | B1* | 6/2010 | Akarte | G06F 11/3688 717/131 |
| 7,908,660 | B2* | 3/2011 | Bahl | G06F 21/577 726/25 |
| 8,418,000 | B1 | 4/2013 | Salame | |
| 8,583,414 | B1* | 11/2013 | Aldrich | G06F 11/3684 703/22 |
| 8,584,100 | B2 | 11/2013 | Xu et al. | |
| 9,329,981 | B2* | 5/2016 | Mizobuchi | G06F 11/3688 |
| 9,727,448 | B1 | 8/2017 | Seibert, Jr. et al. | |
| 10,241,897 | B2* | 3/2019 | Sinha | G06F 11/3664 |
| 10,515,005 | B1* | 12/2019 | Burrell | G06F 11/368 |
| 10,621,077 | B2* | 4/2020 | Wiener | G06F 11/3676 |
| 2005/0081106 | A1* | 4/2005 | Chang | G06F 11/3612 714/38.1 |
| 2006/0136890 | A1* | 6/2006 | Jodh | G06F 9/44552 717/163 |
| 2007/0089092 | A1* | 4/2007 | Schmidt | G06F 8/10 717/126 |
| 2008/0301676 | A1* | 12/2008 | Alpern | G06F 8/65 718/1 |
| 2009/0144698 | A1* | 6/2009 | Fanning | G06F 11/3676 717/120 |
| 2010/0122243 | A1* | 5/2010 | Breton | G06F 8/38 717/163 |
| 2012/0089964 | A1* | 4/2012 | Sawano | G06F 11/3688 717/124 |
| 2013/0067449 | A1* | 3/2013 | Sannidhanam | G06F 8/60 717/170 |
| 2013/0132774 | A1 | 5/2013 | Somendra | |
| 2013/0332916 | A1* | 12/2013 | Chinn | G06F 9/44 717/169 |
| 2015/0007140 | A1* | 1/2015 | Boshernitsan | G06F 11/368 717/124 |
| 2015/0033212 | A1* | 1/2015 | Mizobuchi | G06F 11/3688 717/131 |
| 2018/0137032 | A1* | 5/2018 | Tannous | G06F 8/71 |
| 2018/0267796 | A1* | 9/2018 | Kennedy | G06F 8/61 |
| 2018/0300499 | A1* | 10/2018 | Agarwal | G06F 21/6245 |
| 2018/0322036 | A1* | 11/2018 | Alam | G06F 11/3688 |
| 2018/0336123 | A1* | 11/2018 | Benes | G06F 11/3688 |
| 2019/0079734 | A1* | 3/2019 | Kadam | G06F 8/30 |
| 2019/0095187 | A1* | 3/2019 | Benedek | G06F 8/65 |
| 2020/0202007 | A1* | 6/2020 | Nagaraja | G06F 11/3688 |
| 2020/0371898 | A1* | 11/2020 | Aouad | G06F 9/45558 |

OTHER PUBLICATIONS

Hayden, C., et al., "Efficient systematic testing for dynamically updatable software," Proceedings of the 2nd International Workshop on Hot Topics in Software Upgrades (HotSWUp '09). ACM, New York, NY, USA, Article 9, 5 pages, 2009.

Gu, Z., et al., "Has the bug really been fixed?" Proceedings of the 32nd ACM/IEEE International Conference on Software Engineering—vol. 1 (ICSE '10), vol. 1. ACM, New York, NY, USA, 55-64, 2010.

Umar Janjua, Muhammad, "OnSpot system: test impact visibility during code edits in real software," Proceedings of the 2015 10th Joint Meeting on Foundations of Software Engineering (ESEC/FSE 2015). ACM, New York, NY, USA, 994-997.

* cited by examiner

DYNAMIC AUTOMATION OF DEVOPS PIPELINE VULNERABILITY DETECTING AND TESTING

BACKGROUND

The present embodiments relate to a DevOps (software Development and Operations) pipeline for software delivery. More specifically, the embodiments relate to recognizing one or more vulnerabilities and testing the recognized one or more vulnerabilities with respect to DevOps pipeline compliance and development.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. Cognitive computing is a mixture of computer science and cognitive science. Cognitive computing utilizes self-teaching algorithms that use data minimum, visual recognition, and natural language processing to solve problems and optimize human processes.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly, particularly in the environment of a pipeline for delivering software. Existing solutions for efficiently identifying objects and processing content, as well as changes to the structures, are extremely difficult at a practical level.

SUMMARY

The embodiments include a system, computer program product, and method for integrating vulnerability detecting and testing within a continuous integration and continuous deployment (CI/CD) pipeline for software development and operations (DevOps). The CI/CD pipeline is also called DevOps pipeline.

In one aspect, a computer system is provided with a processing unit operatively coupled to memory and an artificial intelligence (AI) platform. The AI platform supports a continuous integration and deployment (CI/CD) pipeline for software development and operations (DevOps). The AI platform includes tools in the form of a vulnerability detection module, a pipeline manager, a test manager, and a verification manager. The vulnerability detection module functions to monitor one or more running processes. In response to detection of a vulnerability in the monitored one or more processes, the vulnerability detection module identifies one or more vulnerabilities in one or more external code sources or shared libraries. The pipeline manager, which is operatively coupled to the vulnerability detection module, initiates an automated rebuild of a monitored process with the detected vulnerability. The initiation of the automated rebuild includes construction of a source code dependency structure with external relations, construction of a test code structure having all test codes, and construction of a map of the source code dependency structure and the test code structure. The map represents one or more relationships of test code elements corresponding to different portions of source code. The test manager, which is operatively coupled to the pipeline manager, builds a new container image having identified vulnerable source code, and further performs one or more tests on the identified vulnerable source code. The verification manager, which is operatively coupled to the test manager, automatically verifies the identified vulnerable source code is covered by at least one of the represented test code elements, which includes a risk assessment associated with the verification. The pipeline manager selectively deploys the new container image responsive to the risk assessment.

In another aspect, a computer program product is provided to integrate vulnerability detection and testing within a continuous integration and deployment pipeline for software development and operations (DevOps). The computer program product includes a computer readable storage medium having program code embodied therewith. Program code, which is executable by a processor, is provided to monitor one or more running processes, and in response to detection of a vulnerability in the monitored one or more processes, identify one or more vulnerabilities in one or more external code sources or shared libraries. Program code is further provided to initiate an automated rebuild of a monitored process with the detected vulnerability. The initiation of the automated rebuild includes construction of a source code dependency structure with external relations, construction of a test code structure having all test codes, and construction of a map of the source code dependency structure and the test code structure. The map represents one or more relationships of test code elements corresponding to different portions of source code. Program code is provided to build a new container image having identified vulnerable source code, and perform one or more tests on the identified vulnerable source code. Program code is further provided to automatically verify the identified vulnerable source code is covered by at least one of the represented test code elements, which includes a risk assessment associated with the verification, and to selectively deploy the new container image responsive to the risk assessment.

In yet another aspect, a method is provided for integrating vulnerability detection and testing within a continuous integration and deployment (CI/CD) pipeline for software development and operations (DevOps). The method includes monitoring one or more running processes, and identifying one or more vulnerabilities in one or more external code sources or shared libraries. The continuous delivery and deployment pipeline initiates an automated rebuild of the monitored one or more processes with the detected vulnerability, which includes constructing a source code dependency structure with external relations, constructing a test code structure having all test codes, and mapping the source code dependency structure and the test code structure. The mapping represents one or more relationships of test code elements corresponding to different portions of source code. A new container image having identified vulnerable source code is built and one or more tests are performed on the identified vulnerable source code. The process automatically verifies that the identified vulnerable source code is covered by at least one of the represented test code elements, which includes a risk assessment. The new container image is selectively deployed responsive to the risk assessment.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

Figure 1:
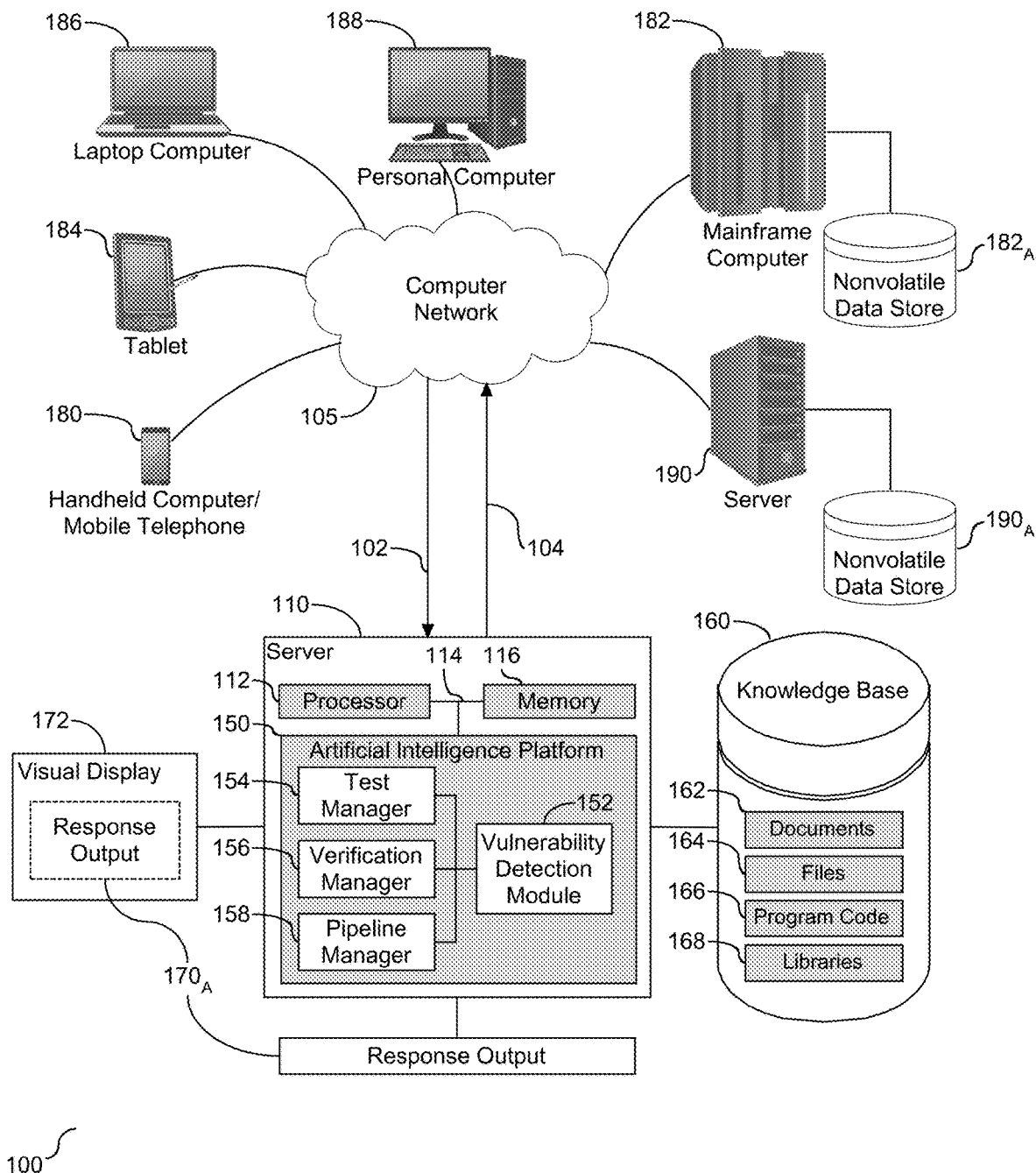
FIG. 1 depicts a schematic diagram of a computer system for use with DevOps software development.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

DevOps (a portmanteau of "development" and "operations") is a software development method that stresses communication, collaboration, integration, automation and measurement of cooperation between software developers and other information-technology (IT) professionals. DevOps acknowledges interdependence of software development, quality assurance, and IT operations, and aims to help an organization rapidly produce software products and services and to improve reliability and security while providing faster development and deployment cycles. A continuous integration and deployment (CI/CD) pipeline is an automated set of processes utilized as part of or integrated into software development and operations (DevOps). The CI/CD pipeline is composed of several stages. In one embodiment, the stages may include Build, Test, and Deploy Development, Integration Tests, Compliance Checks, and Deploy Product. In another embodiment, the stages may include Commit, Build, Test, Stage, and Deploy and collectively span development to production or delivery. Each of the stages is comprised of one or more actions or options. For example, the Test stage may employ a simple tester, an advanced tester, and/or a compliance scanner. In one embodiment, one or more stages of the pipeline may only require a selection of less than all of the available actions, to avoid redundancy and inefficiency. The CI/CD pipeline automates the building, testing, and deployment stages.

A container is a standard unit of software that packages code and all its dependencies so the application runs quickly and reliably from one computing environment to another. A container image is a lightweight, standalone, executable package of software that includes everything required to run an application code, runtime, system tools, system libraries and settings. A container image becomes a container at runtime.

Generally, the DevOps systems span an end-to-end automatic process from building images to the deployment of the container image. The DevOps system also performs test cases, such as regression testing, before the deployment. This testing can encompass application code using vulnerable code incorporated in the container image. As shown and described herein, vulnerability discovery and remediation in the container image is provided in the DevOps pipeline. The remediation may include updating the base image, upgrading libraries, and replacing applications, and corresponding code changes in the container image. The DevOps pipeline requires targeted regression tests to verify whether or not the change in the code is tested for the application using the changed code. The automation is significant and requires analysis of application source code to ascertain direct relations with external libraries and to verify test cases to ensure the vulnerable portion of the code is covered by at least one test.

The embodiments herein automatically undertake tasks, unless the pipeline is stopped for modification by developers, as discussed below. Specifically, vulnerable container images with corresponding libraries are identified. The DevOps pipeline initiates the automated rebuild with vulnerability fixes. The application source code tree structure with call path to external relations is constructed. Correspondingly, the tree components for all test codes are constructed. As used herein, the term "all test codes" refers to all code testing routines stored within a computer system for assessing code changes in a container image. The tree components from the tests to the application source code tree structure are mapped. Verification is made that the updated vulnerable codes are covered by the tests. Also, the embodiments herein remediate the container image based on priorities, i.e., risk levels, to minimize the risk involved in build activities. Otherwise, issues are created for developers with the call path information to update tests including creating tests to cover all vulnerable code with at least one test. The AI operations provide automated updates of the container image. The DevOps pipeline automatically reacts to the vulnerability detection module by verifying that all code portions having vulnerable code are tested. Moreover, developers are assisted to determine how source code map to the external libraries when creating test cases.

Referring to FIG. 1, a schematic diagram of a computer system (100) for use with DevOps software development is depicted. As shown, a server (110) is provided in communication with a plurality of computing devices (180), (182), (184), (186), (188), and (190) across a network connection (105). The server (110) is configured with a processor (112) in communication with memory (116) across a bus (114). The server (110) is shown with an artificial intelligence (AI) platform (150) to support a continuous integration and deployment pipeline for software development and operations (DevOps) over the network (105) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable communication detection, recognition, and resolution. Other embodiments of the server (110) may be used with components, systems, sub-systems, and/or devices other than those that are depicted herein.

The artificial intelligence (AI) platform (150) is shown herein configured to receive input (102) from various sources. For example, artificial intelligence platform (150) may receive input across the network (105) and leverage a knowledge base (160), also referred to herein as a corpus or data source, to apply to DevOps, and in one embodiment program code alignment. As shown, the data source (160) is configured with logically grouped documents (162), files (164), program code (166), and libraries (168). In one embodiment, the data source (160) may be configured with other or additional sources of input, and as such, the sources of input shown and described herein should not be considered limiting. Similarly, in one embodiment, the data source (160) includes structured, semi-structured, and/or unstructured content in a plurality of documents that are contained in one or more databases or corpus. The various computing devices (180), (182), (184), (186), (188), and (190) in communication with the network (105) may include access points for the logically grouped documents (162), files (164), program code (166), and libraries (168). Some of the computing devices may include devices for a database storing the corpus of data as the body of information used by the artificial intelligence platform (150) to generate response output ($170_A$), and to communicate the response output to a visual display (172) operatively coupled to the server (110) or one or more of the computing devices (180)-(190) across network connections (102) and (104).

The network (105) may include local network connections and remote connections in various embodiments, such that the artificial intelligence platform (150) may operate in environments of any size, including local and global, e.g. the Internet. Additionally, the artificial intelligence platform (150) serves as a front-end system that can make available a variety of knowledge extracted from or represented in documents or files, network accessible sources and/or structured data sources. In this manner, some processes populate the artificial intelligence platform (150), with the artificial intelligence platform (150) also including input interfaces to receive requests and respond accordingly.

As shown, content may be in the form of one or more logically grouped documents (162), files (164), program code (166), and libraries (168) for use as part of the corpus (160) of data with the AI platform (150). The corpus (160) may include any structured and unstructured documents, including but not limited to any file, text, article, program code, or source of data (e.g. scholarly articles, dictionary, definitions, encyclopedia references, libraries, operating system code, programs for testing at least a portion of a code, in other words testing code or test cases, and the like) for use by the artificial intelligence platform (150). Content users may access the AI platform (150) via a network connection or an internet connection to the network (105), and may submit input to the artificial intelligence platform (150) that may effectively determine an output response related to the input by searching content in the corpus of data local to the data source (160) or any electronic data source operatively coupled to the server (110) across the network (105).

The AI platform (150) is shown herein with several tools to support content detection and processing, including a vulnerability detection module (152), a test manager (154), a verification manager (156), and a pipeline manager (158). These tools (152), (154), (156), and (158) are operatively coupled, directly or indirectly, together, and provide the functions, as described below.

The vulnerability detection module (152), which can be based in a cloud and integrated with a pipeline, monitors one or more running processes, such as libraries, a base container image, and one or more applications. The vulnerability detection module (152) also identifies one or more vulnerabilities in the one or more processes, which can be one or more external code sources having vulnerable code. The vulnerability can be present in different forms, such as, but not limited to, an outdated library, an old base container image, and an older version of a replaced application. These vulnerabilities sometimes are a source of vulnerable code used in a corresponding container image.

The vulnerability detection module (152) identifies changed code by using change detection either independently or from a coarse-to-granular analysis. Generally, file differences or changesets are discovered by building the original container image and the container image with vulnerable code and identifying the differences in the two sets of code. Typically, the differences are identified by using a data comparison tool, such as diff utility, that calculates and displays the differences between the images. In one embodiment, the vulnerability detection module (152) generates a file changeset that limits validation test selection to one or more tests covering files identified in the generated differential changeset, which is a set of changes that should be treated as an indivisible group or atomic package. After the differential file changeset is generated, validation test selection is limited to one or more tests covering files identified in the generated differential changeset.

At a macro level, the vulnerability detection module (152) analyzes changed source files and creates a function call graph responsive to the changed source file analysis, and identifies any changes at a function level, such as relationships between subroutines. The vulnerability detection module (152) functions to limit test selection responsive to change identification. The selected test validation calls the changed function in the source code, and tests are then selected that make calls to the changed functions in the source code. Accordingly, validation test selection is limited responsive to the change identification by calling the changed functions in the source code.

At a micro level, the vulnerability detection module (152) identifies a remediating activity that involves updating a shared element from a library and a binary. The binary is analyzed to generate a function call graph responsive to the binary analysis. The function call graph functions to identify one or more changes directed at one or more function calls within a binary. Generally, both the vulnerable binary file and fixed binary file are analyzed and binary function differentials are discovered. As an example, this routine identifies whether the vulnerable binary functions retrieve the same data as the fixed binary functions. In one embodiment, the vulnerability detection module (152) functions to limit test selection responsive to the change identification. The selected test includes calling the changed one or more functions within the binary. Coarse granular, macro, and micro differentials can be used to identify vulnerable code changes to the container image. The differentials can be mapped to tests, and the mapping stored, as further described below. Responsive to detection of a vulnerability in one or more running processes, the vulnerability detection module (152) signals the pipeline manager (158) to initiate an automated rebuild, as hereinafter described.

The test manager (154) builds a new container image containing the identified vulnerable source code, after receiving a signal from the pipeline manager (158), and performs one or more tests on the identified vulnerable source code. These tests, typically regression tests, determine if vulnerabilities exist in the new container image and extent of vulnerability by conducting several, different test protocols. In one embodiment, the tests include, but are not limited to, unit testing, integration testing, and smoke testing. Unit testing is a level of software testing where individual units or components of software are tested. Integration testing is a level of software testing where individual units are combined and tested as a group. Smoke testing is a type of software testing that includes a non-exhaustive set of tests that aim at ensuring the workability of select software functions. In one embodiment, the result of smoke testing identifies whether the software is sufficiently stable for further testing. Accordingly, the tests performed by the test manager (154) determine if the vulnerability source code affects, or in one embodiment significantly affects, the operability of the software.

The verification manager (156) automatically verifies the identified source code is covered by at least one of the represented test code elements, which includes assessing a risk associated with the verification. More specifically, the verification manager (156) calculates a risk metric and selectively recommends remedial action based on a corresponding risk threshold. Details of the risk assessment are shown and described in FIG. 4. If the risk metric does not exceed the risk threshold, then the pipeline manager (158) deploys the container image, as discussed below.

The pipeline manager (158) is provided to initiate an automated rebuild of one or more monitored processes determined or otherwise identified with the detected vulnerability. The pipeline manager (158) constructs one or more source code tree structures and a test code tree structure. The source code tree structure represents a call path with external relations. In one embodiment, the external relations include call paths to external libraries used to update and supplement the container image. The test code structure represents test code and data dependency. The pipeline manager (158) analyzes data flow and data dependencies, and identifies any data flow changes. The pipeline manager (158) creates a map to join the source code tree structure with the test code structure. The map represents one or more relationships of represented test code and corresponding portions of the source code. Details of the map and functionality of the pipeline manager (158) are shown and described in FIGS. 3-5.

In some illustrative embodiments, server (110) may be the IBM Watson® system available from International Business Machines Corporation of Armonk, N.Y., which is augmented with the mechanisms of the illustrative embodiments described hereafter. The IBM Watson® system may receive the detected source code as electronic communication input content (102) which it then analyzes to identify presence of intents, such as the identification of one or more portions of vulnerable code, within the content (102). In one embodiment, the AI platform (150) leverages a neural model to detect vulnerabilities within the container image, with the neural model creating output in the form of an updated container image with updated vulnerable code. As shown and described in FIG. 3, and as part of CI/CD, the updated container image is subject to testing by the test manager (154) within the DevOps pipeline. The vulnerability detection module (152), test manager (154), verification manager (156), and pipeline manager (158), hereinafter referred to collectively as AI tools, are shown as being embodied in or integrated within the AI platform (150) of the server (110). In one embodiment, the AI tools may be implemented in a separate computing system (e.g., 190) that is connected across network (105) to the server (110). Wherever embodied, the AI tools function to support vulnerability identification and remediation within the continuous integration and deployment pipeline for software development and operations (DevOps).

Types of information handling systems that can utilize the AI platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store ($190_A$), and mainframe computer (182) utilizes nonvolatile data store (182a). The nonvolatile data store ($182_A$) can be a component that is external to the various information handling systems or can be internal to one of the information handling systems.

The information handling system employed to support the AI platform (150) may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, the information handling system may embody the north bridge/south bridge controller architecture, although it will be appreciated that other architectures may also be employed.

Figure 2:
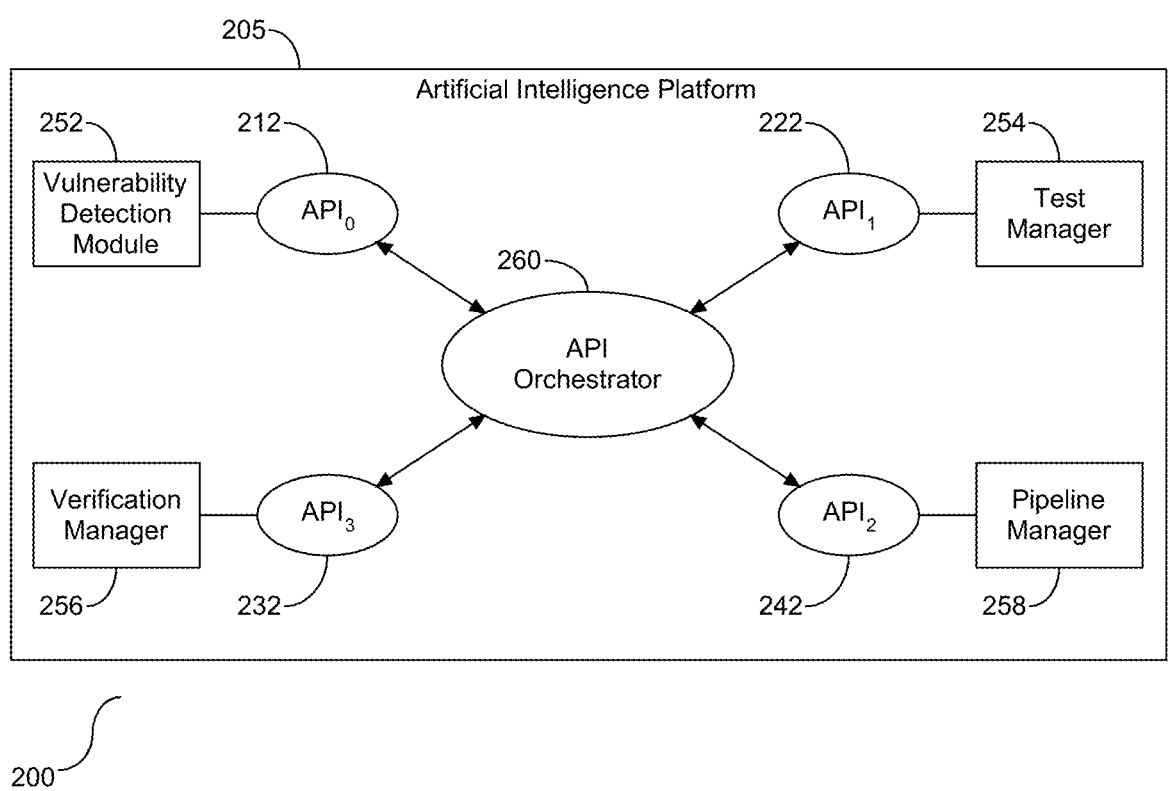
FIG. 2 depicts a block diagram illustrating the AI platform tools, as shown and described in FIG. 1, and their associated application program interfaces (APIs).

An Application Program Interface (API) is understood in the art as a software intermediary between two or more applications. With respect to the artificial intelligence platform (150) shown and described in FIG. 1, one or more APIs may be utilized to support one or more of the tools (152)-(158) and their associated functionality. Referring to FIG. 2, a block diagram (200) is provided illustrating the tools (152)-(158) and their associated APIs. As shown, a plurality of tools are embedded within the artificial intelligence platform (205), with the tools including the vulnerability detection module (252) associated with $API_0$ (212), the test manager (254) associated with $API_1$ (222), the verification manager (256) associated with $API_2$ (232), and the pipeline manager (258) associated with $API_3$ (242). Each of the APIs may be implemented in one or more languages and interface specifications.

$API_0$ (212) provides functional support to monitor one or more running processes and detect vulnerabilities in the monitored processes; $API_1$ (222) provides functional support to perform one or more tests on the identified vulnerable source code; $API_2$ (232) provides functional support to verify that the identified source is covered by at least one of the represented test code elements; and $API_3$ (242) provides functional support to selectively deploy the new container image responsive to the risk assessment. As shown, each of the APIs (212), (222), (232), and (242) are operatively coupled to an API orchestrator (260), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
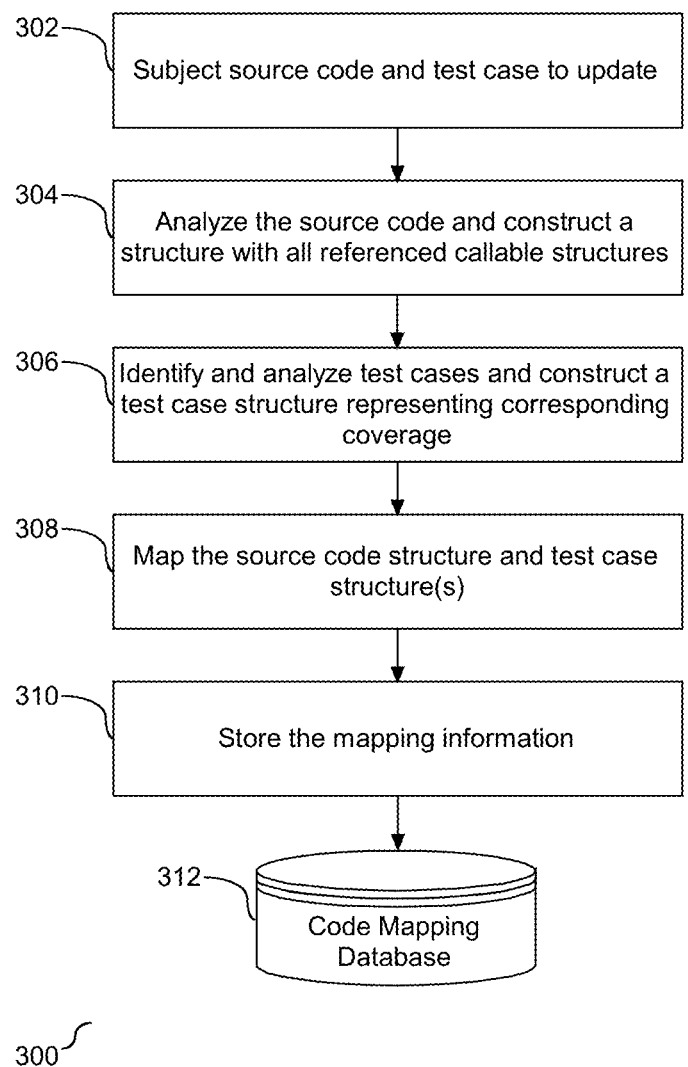
FIG. 3 depicts a flow chart illustrating a process for mapping source code data flow and a test code structure.

Referring to FIG. 3, a flow chart (300) is provided illustrating a process for mapping source code data flow and a test code structure. As shown, the source code and test case(s) are subject to being updated (302). In one embodiment, the update is conducted by a programmer. The source code is analyzed and a corresponding structure, e.g. tree structure, is constructed (304). The tree structure is a representation of all callable structures referenced in the source code, including, but not limited to, libraries and operating systems. In addition, represented test cases are identified and analyzed, and a test case tree, e.g. test case structure, is constructed to represent corresponding coverage (306). Using the tree structures created at steps (304) and (306), a map is created to identify and represent where the source code is covered and what test case(s) represents the covered source code (308). This mapping represents one or more relationships of test code elements corresponding to different portions of source code. The created map and corresponding map information is stored (310) in the code mapping database (DB) (312). In one embodiment, the map and map information is stored in the knowledge base (160). Accordingly, the steps shown herein represents identification of an update or changes to source code and test code, and evaluation and representation of the update or changes.

Figure 4:
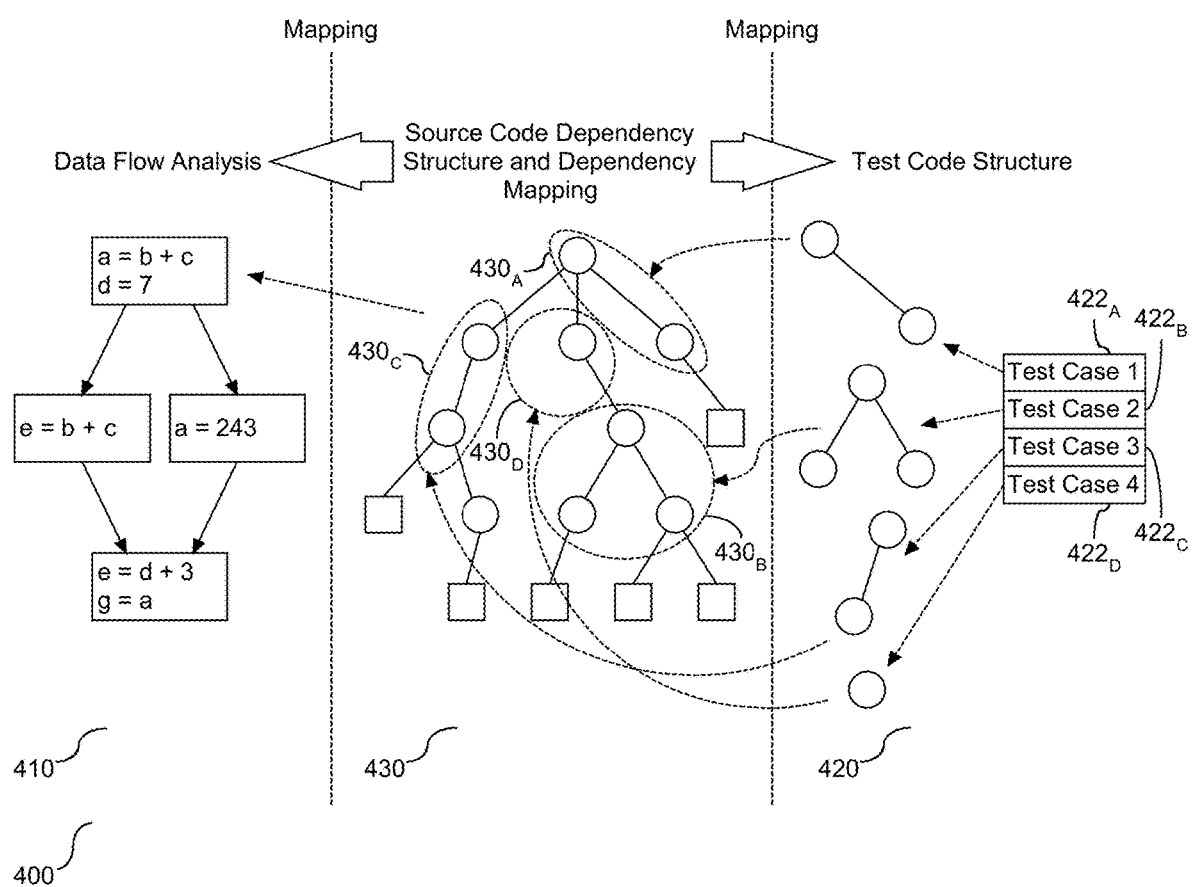
FIG. 4 depicts a block diagram illustrating mapping of the source code dependency structure and the test code structure.

Referring to FIG. 4, a block diagram (400) is provided depicting the mapping of the source code dependency structure and the test code structure. As shown, a source code tree structure (410) represents the source code as a program dependency graph with external relations. The structure (410) is a program dependency graph. A separate structure (420) represents corresponding test case coverage including all test code elements ($422_{A-D}$), as created by the pipeline manager (158). A third structure (430) is shown as a combination of a mapping between the structure (410) and the structure (420). As shown and described in FIG. 1, the pipeline manager (158) constructs the third structure (430) by using source code call path analysis tools and data analysis algorithms. This mapping represents one or more relationships of test code elements ($422_{A-D}$) corresponding to different portions ($430_{A-D}$) of source code. As discussed above, the code can be differentiated by the granular, macro, and micro tests to create representations of different portions of code and then corresponded to different tests to cross-reference portions of code with test code elements. In one exemplary embodiment, the storage data can be in the form of a table, cross-referencing the relationships of test code elements and portions of source code for reference or retrieval. Accordingly, the third structure (430) is a representation of a relationship between test cases and source code.

Figure 5:
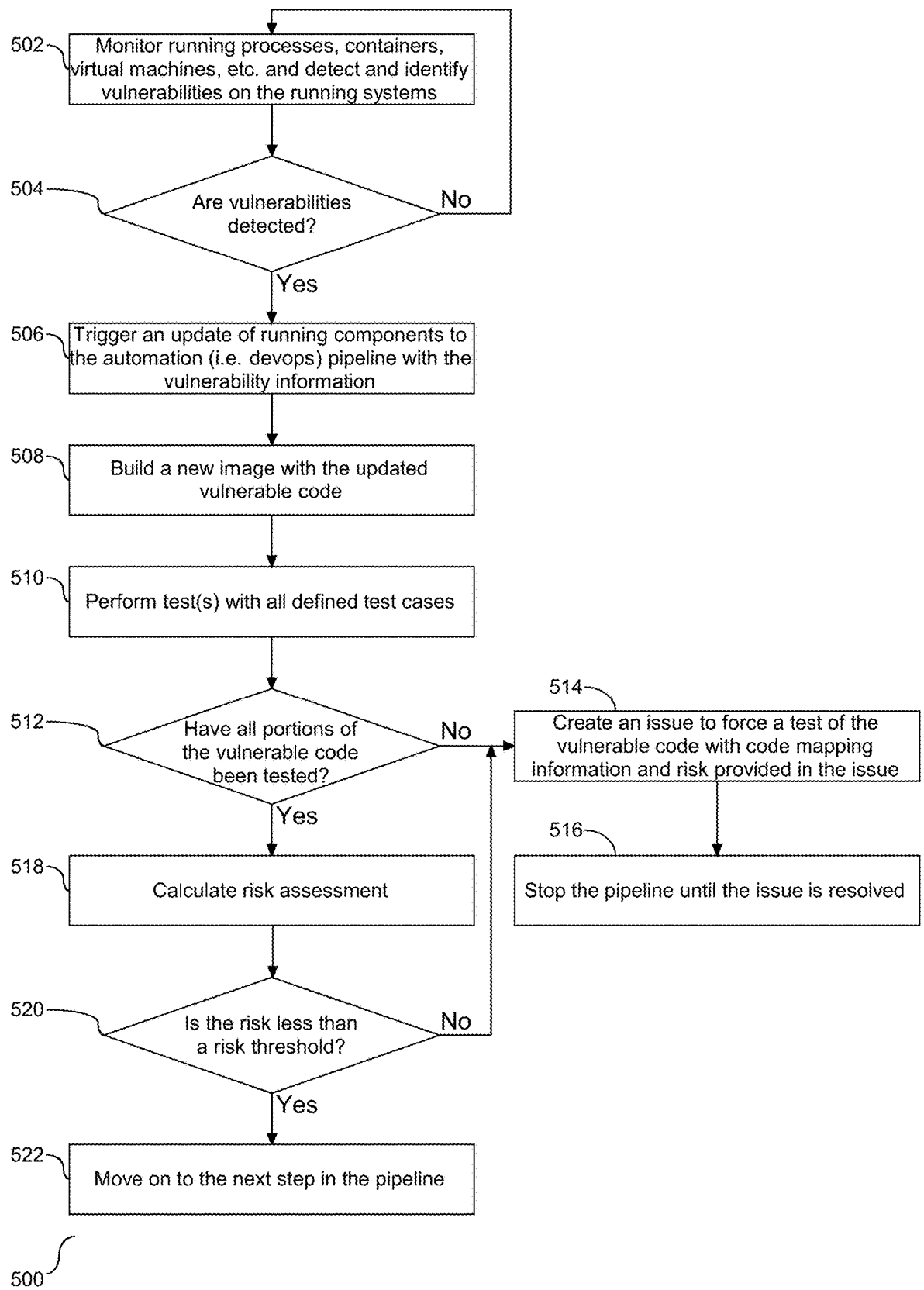
FIG. 5 depicts a flow chart illustrating a process for detecting and testing vulnerabilities, incorporating the correspondence between source code data flow and test case analysis shown and described in FIG. 3.

Referring to FIG. 5, a flow chart (500) is provided illustrating a process for detecting and testing vulnerabilities, incorporating the correspondence between source code data flow and test case analysis shown and described in FIG. 3. As shown, running processes, containers, virtual machines, etc., are subject to monitoring to identify or otherwise detect a vulnerability therein (502). In one embodiment, the monitoring at step (502) takes place as a background process. During the monitoring process, it is determined if a vulnerability is detected (504). A negative response to the determination is followed by a return to step (502) to continue the monitoring process. However, a positive response to the determination triggers an update of running components to the automation pipeline, e.g. DevOps pipeline, with vulnerability information corresponding to the detected vulnerability (506). A new container image with the updated vulnerable source code, such as a library update, is built (508). The map, which represents one or more relationships of test code elements corresponding to different portions of source code, as shown in FIG. 3, is leveraged and tests are performed on the updated and vulnerable source code with the test cases defined in the map (510).

Following step (510), it is determined whether all portions of the identified vulnerable code have been subject to at least one of the defined test cases (512). A negative response to the determination is followed by creating an issue to force a test of the vulnerable code with code mapping information and risk provided in the issue (514). In addition, the pipeline is stopped until the issue is resolved (516). Alternatively, a positive response to the determination is followed by calculating a risk assessment corresponding to the assessed vulnerability (518), and determining if the calculated risk assessment is less than a predetermined risk threshold (520). In one embodiment, the risk assessment is optionally presented on the visual display (172). A positive response to the determination at step (520) is an indication that the risk assessment and corresponding value does not exceed the risk threshold, and is followed by proceeding to the next step in the pipeline (522), which in one embodiment is demonstrated by deploying the container image. However, a negative response to the determination at step (518) is followed by a return to step (514). Accordingly, a risk level assessment is conducted to evaluate the detected vulnerabilities.

As shown in FIGS. 1 and 5, a risk level assessment corresponding to application of test code elements to the identified source code vulnerability is conducted to identify a corresponding risk level violation. The following is an example risk function:

$$R(\theta,\delta) = E_\theta L(\theta, \delta(X)) = \int_x L(\theta, \delta(X)) dP_\theta(X)$$

where θ is a fixed (possibly unknown) state of nature, X is a vector of observations stochastically drawn from a population (e.g. prior application, server profiles, listed of upgrade actions, and versions), $E_\theta$ is the expectation overall population values of X; L is a distance function; $dP_\theta$ is a probability measure over the event space of X, parametrized by θ; and the integral is evaluated over the entire support of X. The risk level assessment is conducted dynamically. In the event a violation is identified, such as in the corresponding risk function, the pipeline manager (158) selectively forces a stop of the pipeline to test the vulnerable code. In one embodiment, the pipeline is stopped until the issue associated with the vulnerable code is resolved.

It is understood that the risk assessment corresponds to suspected vulnerable code, and that the risk assessment can be presented or otherwise displayed as risk assessment data. In one embodiment, the risk assessment data can be displayed in a structure, such as a table, displaying the files tested for vulnerable code and cross-referenced with statements, branches, functions and lines to provide a code coverage report for all the portions of the code. The structure may include a plurality of cells with applied indicia to convey a corresponding risk assessment. For example, in one embodiment, the indicia may be in the form of color, with different colors representing different levels of risk. Alternatively, the test elements can be corresponded with previously identified changesets, function differentials, and binary function differentials of source code in a table and optionally displayed to provide a visual determination of covered code portions by tests.

Aspects of integrating vulnerability detection and testing within a CI/CD are shown and described with the tools (152)-(158) shown in FIGS. 1, and 2, and the processes shown in FIGS. 3 and 5. Aspects of the functional tools (152)-(158) and their associated functionality may be embodied in a computer system/server in a single location, or in one embodiment, may be configured in a cloud-based system sharing computing resources. With references to FIG. 6, a block diagram (600) is provided illustrating an example of a computer system/server (602), hereinafter referred to as a host (602) in communication with a cloud-based support system, to implement the processes described above with respect to FIGS. 3 and 5. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments (610) where tasks are performed by remote processing devices that are linked through a communications network. In a distributed cloud computing environment, program modules may be located in both local and remote computer system storage media including memory storage devices.

Figure 6:
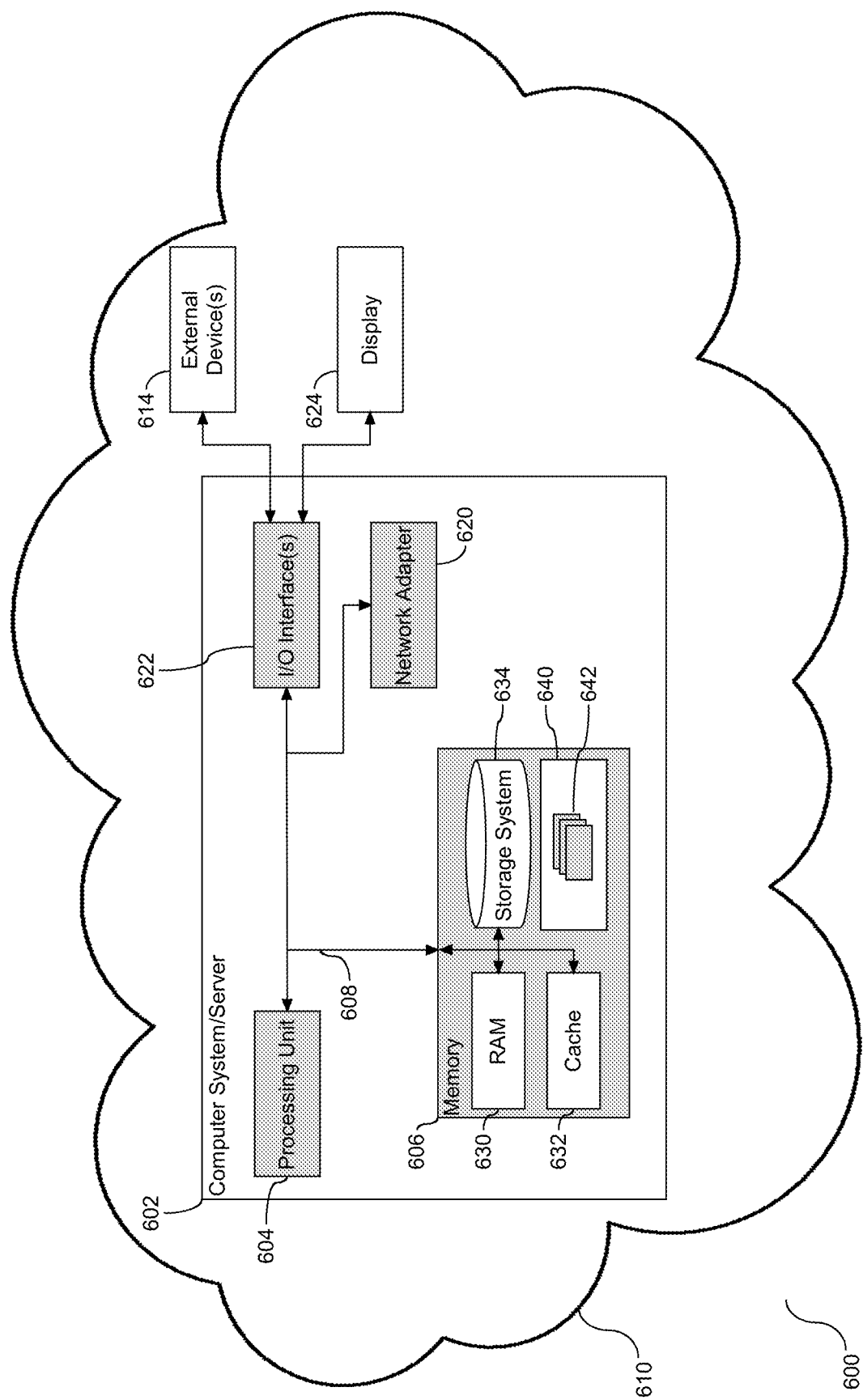
FIG. 6 depicts a block diagram illustrating an example of a computer system/server of a cloud based support system, to implement the system and processes described above with respect to FIGS. 1-5.

As shown in FIG. 6, host (602) is shown in the form of a general-purpose computing device. The components of host (602) may include, but are not limited to, one or more processors or processing units (604), e.g. hardware processors, a system memory (606), and a bus (608) that couples various system components including system memory (606) to processing unit (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (630) and/or cache memory (632). By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (640), having a set (at least one) of program modules (642), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (642) generally carry out the functions and/or methodologies of embodiments to integrate of vulnerability detection and testing within a CI/CD pipeline for software development and operations (DevOps). For example, the set of program modules (642) may include the tools (152)-(158) as described in FIG. 1.

Host (602) may also communicate with one or more external devices (614), such as a keyboard, a pointing device, etc.; a display (624); one or more devices that enable a user to interact with host (602); and/or any devices (e.g., network card, modem, etc.) that enable host (602) to communicate with one or more other computing devices. Such communication can occur via Input/Output (I/O) interface(s) (622). Still yet, host (602) can communicate with one or more networks such as a local area network (LAN), a general wide area network (WAN), and/or a public network (e.g., the Internet) via network adapter (620). As depicted, network adapter (620) communicates with the other components of host (602) via bus (608). In one embodiment, a plurality of nodes of a distributed file system (not shown) is in communication with the host (602) via the I/O interface (622) or via the network adapter (620). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (606), including RAM (630), cache (632), and storage system (634), such as a removable storage drive and a hard disk installed in a hard disk drive.

Computer programs (also called computer control logic) are stored in memory (606). Computer programs may also be received via a communication interface, such as network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
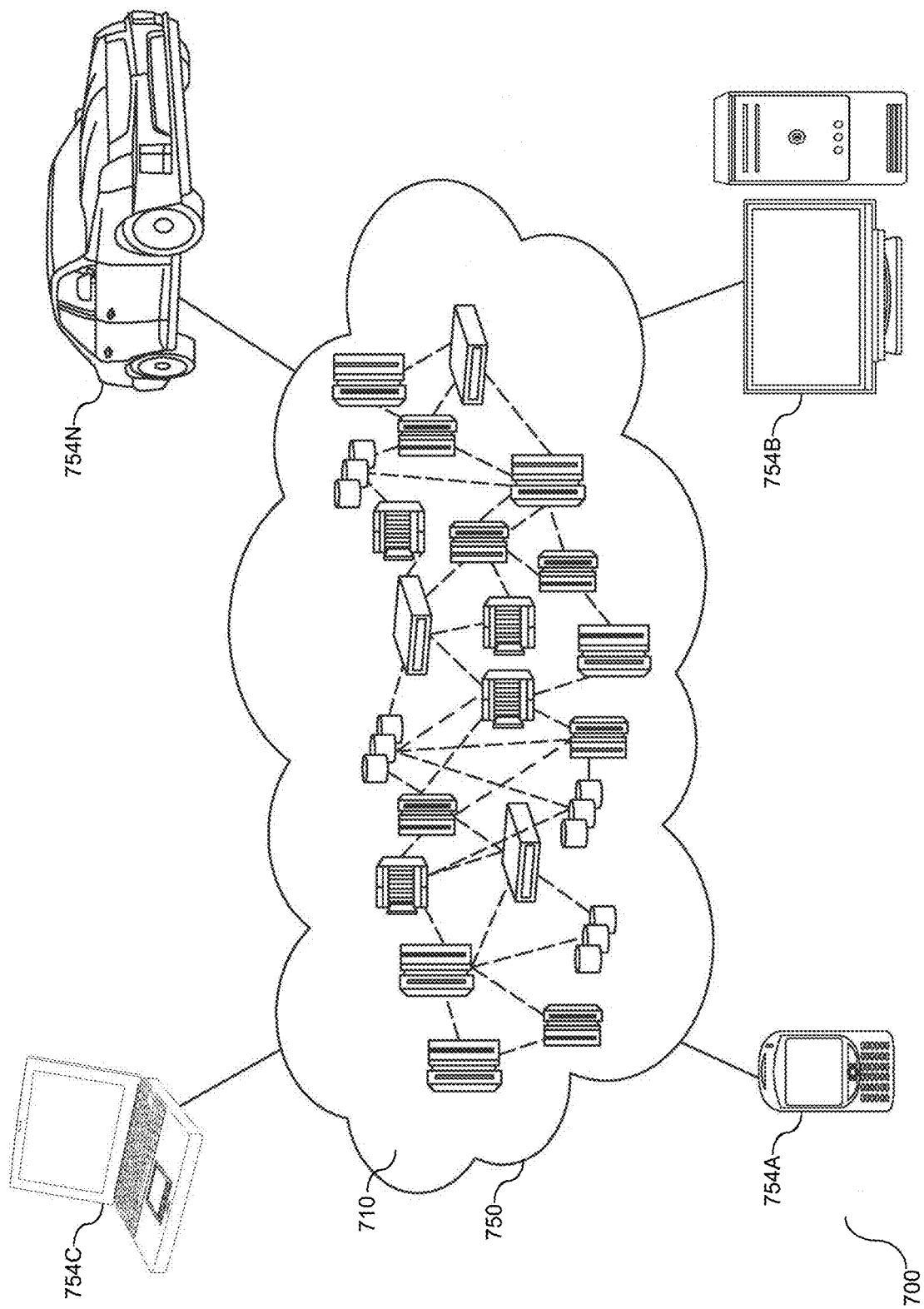
FIG. 7 depicts a block diagram illustrating a cloud computer environment.

Referring now to FIG. 7, an illustrative cloud computing network (700). As shown, cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (754A), desktop computer (754B), laptop computer (754C), and/or automobile computer system (754N). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (754A-N) shown in FIG. 7 are intended to be illustrative only and that the cloud computing environment (750) can communicate with any type of computerized device over any type of network and/or network addressable connection (e.g., using a web browser).

Figure 8:
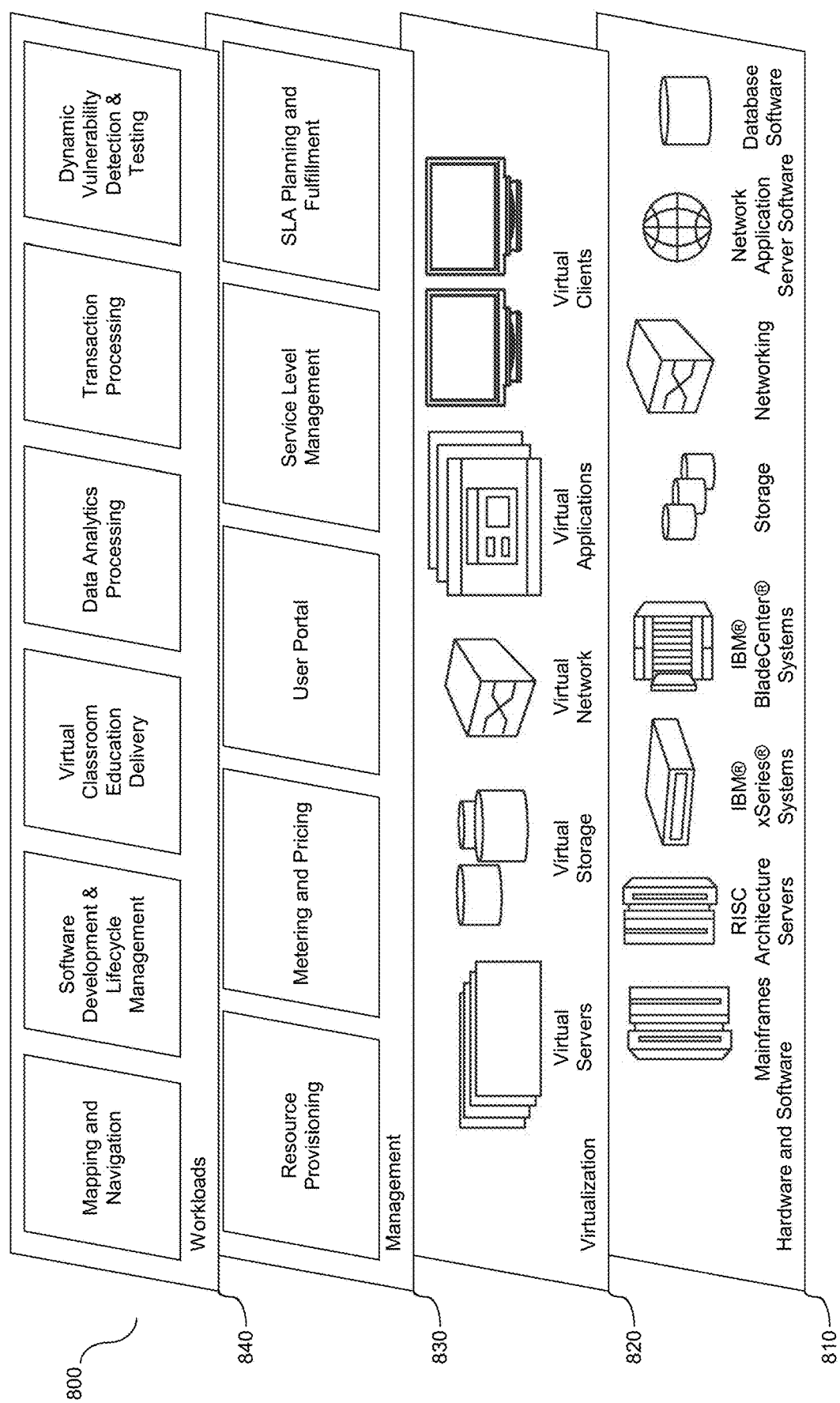
FIG. 8 depicts a block diagram illustrating a set of functional abstraction model layers provided by the cloud computing environment.

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840).

The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and integration of vulnerability detection and testing within a CI/CD pipeline for software development and operations (DevOps).

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product are operative to improve the functionality and operation of an AI platform to automatically detect and test vulnerabilities for a pipeline delivery system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, the natural language processing may be carried out by different computing platforms or across multiple devices. Furthermore, the data storage and/or corpus may be localized, remote, or spread across multiple systems. Accordingly, the scope of protection of the embodiments is limited only by the following claims and their equivalents.

What is claimed is:

1. A computer system comprising:
   a processing unit operatively coupled to memory;
   an artificial intelligence (AI) platform operatively coupled to the processing unit, the AI platform implementing at least one program module supporting a continuous integration and continuous deployment pipeline for software development and operations (DevOps), including:
      monitor one or more running processes, and responsive to detection of a vulnerability in the monitored one or more processes, identify one or more vulnerabilities in one of at least one or more external code sources and one or more shared libraries having corresponding vulnerable source code;
      initiate an automated rebuild of the monitored one or more processes with the detected vulnerability, including:
         update the vulnerable source code corresponding to the identified one or more vulnerabilities, wherein the update generates an updated vulnerable source code;
         construct a source code dependency structure for the updated vulnerable source code comprising a program dependency graph with external relations;
         construct a test code structure comprising all test codes; and
         map the source code dependency structure and the test code structure, the map to represent one or more relationships of test code elements corresponding to different portions of the updated vulnerable source code;
      build a new container image comprising the updated vulnerable source code;
      leverage the map to identify one or more tests related to the updated vulnerable source code and perform the identified one or more tests on the updated vulnerable source code to determine if the updated vulnerable source code affects operability; and
      automatically verify the updated vulnerable source code is covered by at least one of the represented test code elements, including assessing a risk associated with the verification, and further comprising selectively deploying the new container image responsive to the risk assessment.

2. The system of claim 1, wherein the AI platform further calculates a risk metric and recommends a remedial action if the risk metric exceeds a risk threshold, and deploys the container image if the risk metric does not exceed the risk threshold.

3. The system of claim 1, wherein constructing the source code dependency structure includes analyzing data flow and data dependencies and identifying any data flow changes.

4. The system of claim 1, wherein the identification of the one or more vulnerabilities in the one or more external code sources comprising the vulnerable code further comprises:
   comparing file metadata between a vulnerable version of the source code and a remedied version of the source code;
   generating a differential file changeset; and
   limiting test selection to one or more tests covering files identified in the generated differential changeset.

5. The system of claim 1, wherein the identification of the one or more vulnerabilities in the one or more external code sources comprising the vulnerable code further comprises:
   analyzing changed source files and creating a function call graph responsive to the changed source file analysis, and identifying any changes at a function level; and
   limiting test selection responsive to the change identification, the selected test calling the changed functions in the source code.

6. The system of claim 1, wherein the identification of the one or more vulnerabilities in the one or more external code sources comprising the vulnerable code further comprises:
   identifying a remediating activity involves updating a shared element selected from a library and a binary;
   analyzing the binary, generating a function call graph responsive to the binary analysis, the function call graph identifying one or more changes directed at one or more function calls within the binary; and
   limiting test selection responsive to the change identification, the selected test including calling the changed one or more functions within the binary.

7. A computer program product to integrate a vulnerability detection and testing within a continuous integration and continuous deployment pipeline for software development and operations (DevOps), the computer program product comprising a computer readable storage medium having program code embodied therewith, the program code executable by a processor to:
   monitor one or more running processes, and responsive to detecting a vulnerability in the monitored one or more processes, identify one or more vulnerabilities in one of at least one or more external code sources and one or more share libraries having corresponding vulnerable source code;
initiate an automated rebuild of the monitored one or more processes with the detected vulnerability, including:
update the vulnerable source code corresponding to the identified one or more vulnerabilities, wherein the update generates an updated vulnerable source code;
construct a source code dependency structure for the updated vulnerable source code comprising a program dependency graph with external relations;
construct a test code structure comprising all test codes; and
map the source code dependency structure and the test code structure, the map representing one or more relationships of test code elements corresponding to different portions of the updated vulnerable source code;
build a new container image comprising the updated vulnerable source code;
leverage the map to identify one or more tests related to the updated vulnerable source code and perform the identified one or more tests on the updated vulnerable source code to determine if the updated vulnerable source code affects operability; and
automatically verify the updated vulnerable source code is covered by at least one of the represented test code elements, including assess a risk associated with the verification and selectively deploy the new container image responsive to the risk assessment.

8. The computer program product of claim 7, further comprising program code to calculate a risk metric for the risk assessment and recommend a remedial action if the risk metric exceeds a risk threshold, and deploy the container image if the risk metric does not exceed the risk threshold.

9. The computer program product of claim 7, wherein construction of the source code dependency structure includes program code to analyze data flow and data dependencies and identify any data flow changes.

10. The computer program product of claim 7, wherein the program code to identify the one or more vulnerabilities in the one or more external code sources comprising the vulnerable code further comprises program code to:
compare file metadata between a vulnerable version of the source code and a remedied version of the source code;
generate a differential file changeset; and
limit test selection to one or more tests covering files identified in the generated differential changeset.

11. The computer program product of claim 7, wherein the program code to identify the one or more vulnerabilities in the one or more external code sources comprising the vulnerable code further comprises program code to:
analyze changed source files and create a function call graph responsive to the changed source file analysis, and identify change at a function level; and
limit test selection responsive to the change identification, the selected test calling the changed functions in the source code.

12. The computer program product of claim 7, wherein the program code to identify the one or more vulnerabilities in the one or more external code sources comprising the vulnerable code further comprises program code to:
identify a remediating activity involves updating a shared element selected from a library and a binary;
analyze the binary, generate a function call graph responsive to the binary analysis, the function call graph identifying one or more changes directed at one or more function calls within a binary; and
limit test selection responsive to the change identification, the selected test including calling the changed one or more functions within the binary.

13. A method for integrating vulnerability detection and testing within a continuous integration and continuous deployment (CI/CD) pipeline for software development and operations (DevOps), comprising:
monitoring one or more running processes, and responsive to detecting a vulnerability in the monitored one or more processes, and identifying one or more vulnerabilities in one of at least one or more external code sources and one or more shared libraries having corresponding vulnerable source code;
the continuous delivery and deployment pipeline initiating an automated rebuild of monitored one or more processes with the detected vulnerability, including:
updating the vulnerable source code corresponding to the identified one or more vulnerabilities, wherein the update generates an updated vulnerable source code;
constructing a source code dependency structure for the updated vulnerable source code comprising a program dependency graph with external relations;
constructing a test code structure comprising all test codes; and
mapping the source code dependency structure and the test code structure, the mapping representing one or more relationships of test code elements corresponding to different portions of the updated vulnerable source code;
building a new container image comprising the updated vulnerable source code;
leveraging the map to identify one or more tests related to the updated vulnerable source code and performing the identified one or more tests on the updated vulnerable source code determining if the updated vulnerable source code affects operability; and
automatically verifying the updated vulnerable source code is covered by at least one of the represented test code elements, including assessing a risk associated with the verification and selectively deploying the new container image responsive to the risk assessment.

14. The method of claim 13, wherein the risk assessment further comprises calculating a risk metric, and the selective deployment of the new container image includes deploying the container image if the risk metric does not exceed a risk threshold, and recommending a remedial action if the risk metric exceeds the risk threshold.

15. The method of claim 13, wherein constructing the source code dependency structure includes analyzing data flow and data dependencies and identifying any data flow changes.

16. The method of claim 13, wherein the identification of the one or more vulnerabilities in the one or more external code sources comprising the vulnerable code further comprises:
comparing file metadata between a vulnerable version of the source code and a remedied version of the source code;
generating a differential file changeset; and
limiting test selection to one or more tests covering files identified in the generated differential changeset.

17. The method of claim 13, wherein the identification of the one or more vulnerabilities in the one or more external code sources comprising the vulnerable code further comprises:

- analyzing changed source files and creating a function call graph responsive to the changed source file analysis, and identifying changes at a function level; and
- limiting test selection responsive to the change identification, the selected test calling the changed functions in the source code.

18. The method of claim 13, wherein the identification of the one or more vulnerabilities in the one or more external code sources comprising the vulnerable code further comprises:

- identifying a remediating activity involves updating a shared element selected from a library and a binary;
- analyzing the binary, generating a function call graph responsive to the binary analysis, the function call graph identifying one or more changes directed at one or more function calls within a binary; and
- limiting test selection responsive to the change identification, the selected test including calling the changed one or more functions within the binary.

* * * * *